May 30, 1944. R. K. HOPKINS 2,350,233
APPARATUS FOR THE PRODUCTION OF METAL
Filed Feb. 25, 1943     2 Sheets-Sheet 1
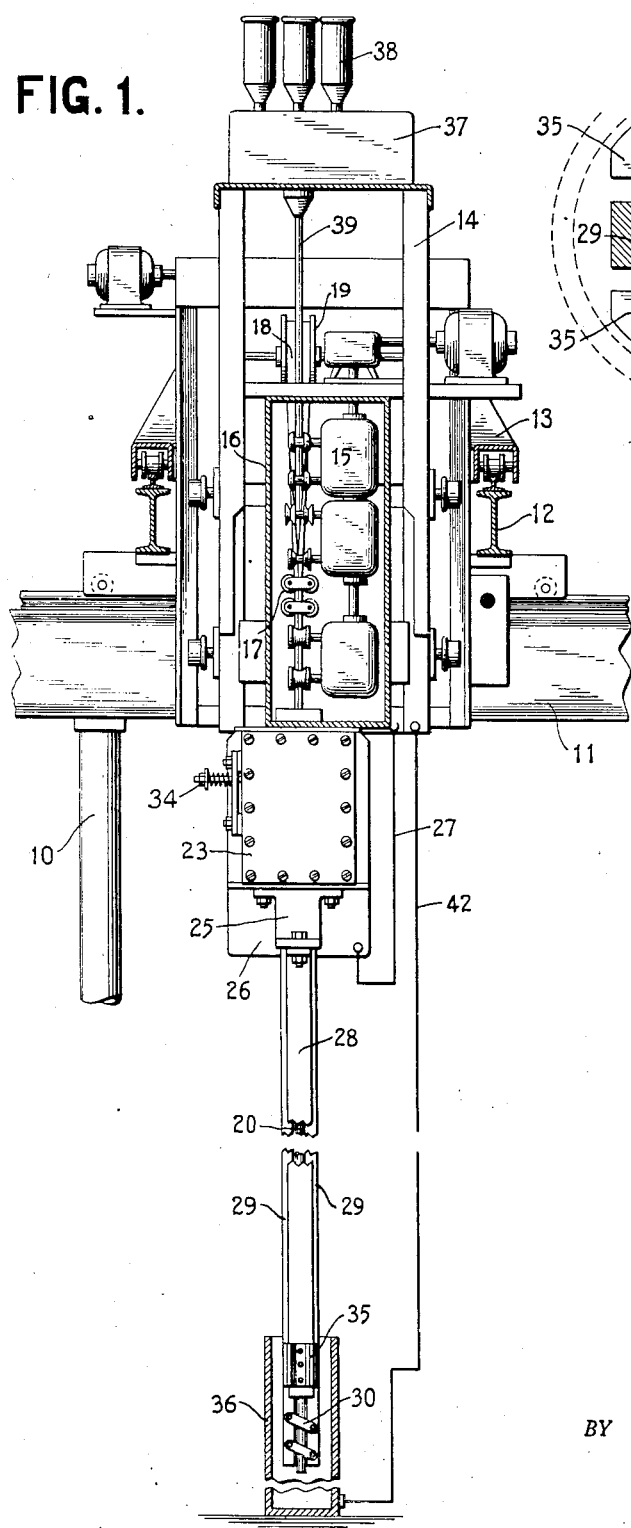
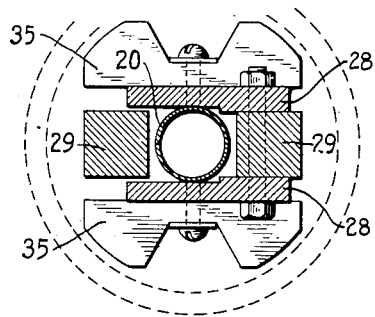
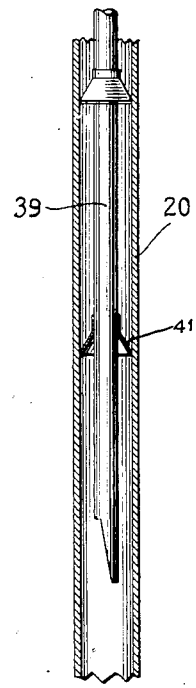
INVENTOR.
Robert K. Hopkins
BY Virgil F. Davico May 30, 1944.   R. K. HOPKINS   2,350,233
APPARATUS FOR THE PRODUCTION OF METAL
Filed Feb. 25, 1943   2 Sheets-Sheet 2
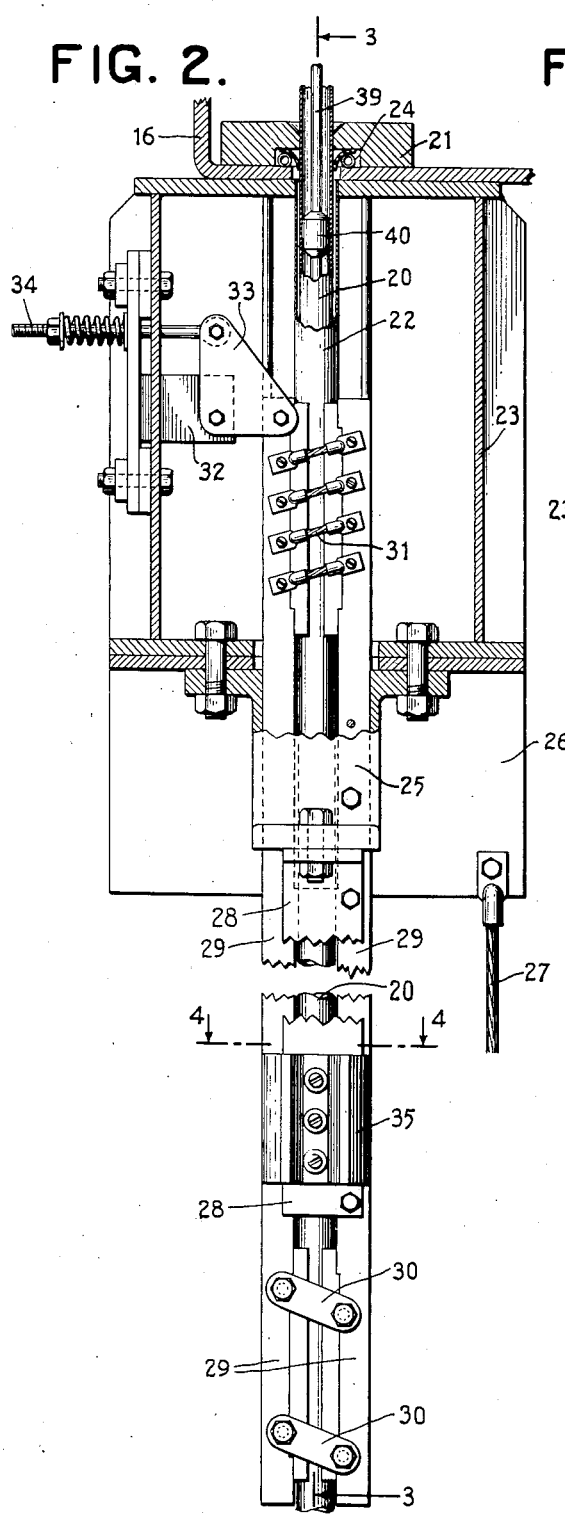
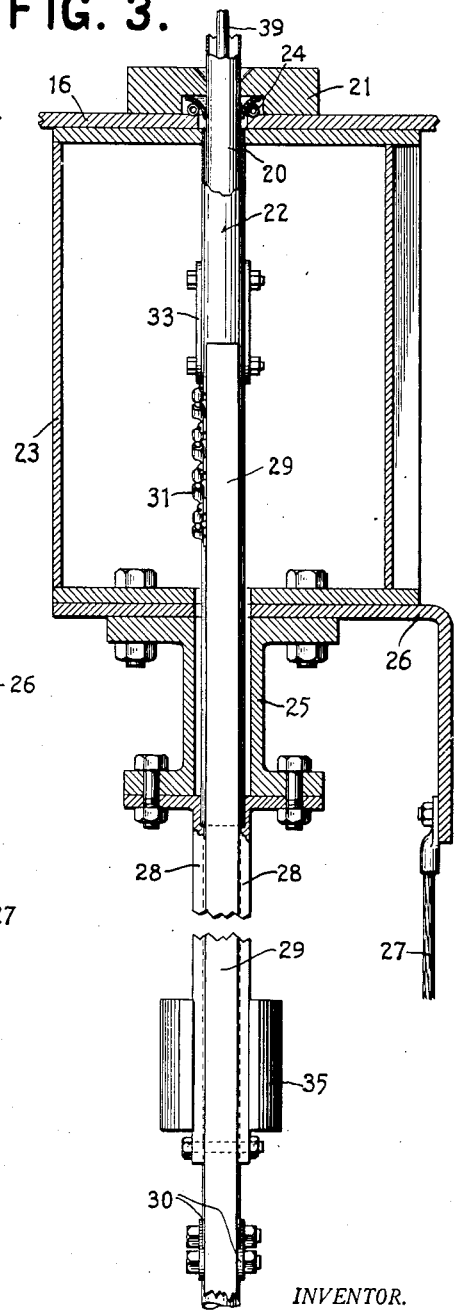
INVENTOR.
Robert K. Hopkins
BY
Virgil F. Davies Patented May 30, 1944

2,350,233

UNITED STATES PATENT OFFICE 2,350,233

APPARATUS FOR THE PRODUCTION OF METAL

Robert K. Hopkins, New York, N. Y., assignor to The M. W. Kellogg Company, New York, N. Y., a corporation of Delaware Application February 25, 1943, Serial No. 477,019

12 Claims. (Cl. 219—8)

This invention relates to apparatus for producing metal by subjecting constituents thereof to the influence of electric current discharged through a gap beneath the surface of a protective blanket of flux, and in particular, to such apparatus in which a strip made of one or more constituents of the desired metal is formed into a hollow electrode through which raw materials in subdivided condition containing constituents of the desired metal are supplied to the electric current discharge at the end of the electrode.

I have heretofore disclosed apparatus for producing metal which includes arrangements for forming a metal strip into a hollow metal electrode and feeding it at a rate controlled to maintain a discharge of predetermined characteristics from its end. The apparatus disclosed also includes arrangements for conducting the electric current to the electrode and arrangements for feeding into the electrode raw material in subdivided form for conveyance to the electric current discharge. It has been found that the electrode forming and associated arrangements are subject to excessive wear by reason of the subdivided raw materials and dust which find their way to them. When the apparatus is employed in the manufacture of metal bodies of considerable length, such as commercial ingots, difficulties are also experienced because of the length of the electrode between its forming arrangements and its discharge end. When the electrode is long even slight disturbances at its discharge end will set up a whipping action which makes close control of the electric current discharge difficult if not impossible. Since it is necessary to lead the current to the electrode as near to its discharge end as possible it is also difficult, especially when a narrow mold is used, to maintain proper contact between the current carrying elements and the electrode.

It is a primary object of this invention to provide novel apparatus of the character mentioned in which the passage of the subdivided raw materials from the interior of the electrode to the electrode forming and feeding arrangements, and other portions of the apparatus which include moving parts subject to wear, is effectively prevented in a simple and efficient manner. It is also an object of the invention to provide novel arrangements for conducting current to the electrode which assure proper contact with the electrode regardless of the length of the electrode and which are so constructed that they stiffen the electrode and reduce its tendency to whip. It is a further object of the invention to provide novel means associated with the electrode current conducting arrangements for limiting the possible lateral movement of the electrode so that whipping of the electrode end may be kept within allowable limits regardless of the length of the mold space.

The further objects and advantages of the invention will be apparent from the following description of a present preferred form of the invention, taken with the accompanying drawings, in which, Fig. 1 is a front view, partly in section, of an apparatus assembly which includes a present preferred form of the apparatus of the invention, Fig. 2 is an enlarged front view, partly in section, of the lower end of the apparatus of Fig. 1, Fig. 3 is a sectional view taken on line 3—3 of Fig. 2, Fig. 4 is a sectional view taken on line 4—4 of Fig. 2, and Fig. 5 is a fragmentary sectional view illustrating an alternate form of sealing element.

The apparatus of the invention is of general application and is adapted for use in the production of ferrous as well as non-ferrous metals; likewise it may be employed in the production of metal bodies of homogenous character and analysis as well as composite metal bodies in the production of which metal is produced and united to a base of previously produced metal. For the purposes of this application the novel apparatus is disclosed in connection with a mold in which is adapted to be produced an ingot of homogeneous character and analysis.

The apparatus shown includes a support 10, formed of structural members, provided with horizontal members 11 upon which a bridge 12 is mounted for movement. A truck 13 is mounted on bridge 12. By means of this arrangement truck 13 may be moved in any horizontal direction. A frame 14 is mounted for vertical movement relative to truck 13. Frame 14 may be moved manually or by motor means to position the end of the electrode in the mold and to maintain a substantially constant distance between the bottom of the frame and the surface of the molten material in the mold.

Electrode forming and feeding mechanism 15 is supported on frame 14 and is enclosed in a casing 16 which serves to exclude dust and other erosive material, which are evolved in the operation, from the component part of the mechanism. Mechanism 15 includes a plurality of rollers 17 which are adapted to form a flat strip 18, supplied from a reel 19 also carried by frame 14, into a hollow electrode 20. Rollers 17 may be driven by a variable speed motor which is arc controlled, as is common in the arc welding and electric furnace art, to form and feed the electrode as required to maintain an electric discharge of substantially constant characteristics from its end. Alternatively, the electrode may be fed at a constant rate, equal to the desired rate of burnoff, and the current supply adjusted to burn the electrode at the rate supplied.

Electrode 20, after leaving the last of the forming rolls, moves through the flared hole in block 21 and into tube 22 which passes through box 23. Box 23 is sealed as by removable sides against the passage of dust thereinto. The top end of the hole in block 21 is flared so that the end of electrode 20 may easily find its way thereinto. The lower end of the hole in block 21 is enlarged to accommodate seal 24 which bears against electrode 20. A flanged sleeve member 25 is attached to box 23, a plate 26 of copper connected by cable 27 to one side of the electric current supply being interposed between box 23 and sleeve 25. The electric current may be supplied by a generator or a transformer, carried on truck 13 or elsewhere on or near the apparatus, or by a connection to an outside current source.

To the bottom flange of sleeve 25 are attached two generally L-shaped bars 28. Tube 22 terminates a short distance below the line of attachment of bars 28. Between bars 28 are found a pair of generally square copper bars 29 that conduct the current to the electrode. One of bars 29 is fastened between bars 28 to produce a generally U-shaped structure of great rigidity, the other bar 29 while between bars 28 is sufficiently spaced therefrom to provide an easy exit for any granular material that may pass out of the seam of electrode 20. The bar 29 that is attached to bars 28 is also attached to sleeve 25 so that it is restrained against independent vertical movement. Bars 29 pass through sleeve 25 and into box 23. Contact shoes are provided at each end of bars 29. At the upper end of bars 29 the shoes contact tube 22 while at the lower end of bars 29 the shoes contact electrode 20 and serve to lead the current thereto. A pair of pivoted links 30 arranged as shown, unite the lower ends of bars 29. A number of braided copper jumpers 31 are connected to the ends of bars 29 to assure the bars being maintained at the same potential.

A pivot block 32, attached to a side of box 23, carries a pin upon which are pivoted a pair of cranks 33 which straddle the bar 29 that is not restrained in sleeve 25. This bar 29 is provided with a slot through which passes a pin carried at one end of cranks 33. Between the cranks and at the other end thereof is pivoted an adjustment screw 34 that extends through the side of box 23. A nut is provided on screw 34 and a spring is interposed between the nut and the side of box 23. By rotating the nut in the direction to pull screw 32 outwardly of box 23, cranks 33 raise bar 29. This vertical movement of the free bar 29 raises the ends of links 30 attached thereto and thus shortens the distance between the contact shoes at the ends of bars 29. In this manner pressure is applied to give the desired contact. The spring makes it possible for the pressure to be relieved as required to allow irregularities in the electrode to pass without jamming or binding. By this arrangement any desired pressure may be constantly applied regardless of the length of the electrode between the forming rolls and the discharge end of the electrode. At the ends of bars 28 are attached wing like members 35. These members are made of non-conducting material and are of such size as to clear the sides of mold 36 by a distance sufficient to permit unimpeded vertical movement of the contact device in the mold and yet large enough to prevent substantial lateral movement of the electrode.

A casing 37 is supported at the upper end of frame 14. Casing 37 houses a plurality of metering devices which receive granular raw materials from hoppers 38 and feed them at uniform selected rates into tube 39. Tube 39 passes through rolls 17 and enters electrode 20. Tube 39 terminates in box 23 so that it deposits the raw materials into electrode 20 well after electrode 20 is completely formed and also well below casing 16 and the apparatus elements contained therein. Tube 39 is ended gradually as shown to prevent accumulation of granular material at the tube end when the pressure within electrode 20 increases. The pressure within electrode 20 will fluctuate from time to time due to gas evolution at the discharge end thereof. This gas may be due to moisture or organic material carried by the granular raw materials or to reactions which evolve gas. The pressure fluctuations are pulsating in character and sometimes are quite violent. An increase in pressure in electrode 20 will tend to drive some of the granular materials through the seam of the electrode. The granular material that is thus driven out of electrode 20 will fall in the space between bars 28 and 29 and because of the opening between these bars will fall towards mold 36. Seal 24 prevents such material from rising into casing 16.

The pressure fluctuations are sometimes sufficient to drive the granular raw materials up electrode 20 into casing 16. To prevent this and the consequences that follow members, or a member, may be provided on tube 39 which so restrict the passageway between electrodes 20 and tube 39 that the effects of the pressure cannot be appreciably felt beyond them. In Figs. 2 and 3 these members take the form of closed ended sleeves 40 united to tube 39. These sleeves are small enough to allow electrode 20 to pass freely but yet large enough to restrict the passageway between electrode 20 and tube 39 to such a degree that the pressure fluctuations are not felt above them. In Fig. 5 these members take the form of conical members 41 attached to tube 39, made of rubber, cloth, or similar material, that lightly bear against electrode 20 and effectively seal the space between electrode 20 and tube 39.

Mold 36 is conventionally shown since it per se does not form part of the invention, hence, mold 36 may be of any material suitable for the purpose and of the size required by the metal body to be produced. The electric current is led to mold 36 through cable 42. The blanket of flux, not shown, beneath which the metal producing operations are generally carried out may be of any suitable composition.

Frame 14 and the apparatus elements carried thereby have been shown as vertically movable while mold 36 is shown as fixed. This is illustrative only as frame 14 and the elements carried thereby may be held fixed while mold 36 is moved vertically as required.

I claim:

1. In apparatus for producing metal, in combination, means for feeding a hollow electrode to a gap whereat the electrode is fused by the discharge of electric current, supply means for granular material to be subjected to the electric current discharge at said gap, means including a conduit for conducting the granular material from said supply means into the electrode, said conduit extending into said electrode a substantial distance beyond the point at which said electrode last contacts said feeding means, and means carried by said conduit restricting the space between the hollow electrode and said conduit effective to prevent pressure surges within the hollow electrode from moving substantial quantities of the granular material to said feeding means.

2. In apparatus for producing metal, in combination, means for forming a metal strip into a hollow electrode and for feeding the formed electrode to a gap whereat the electrode is fused by the discharge of electric current, supply means for granular material to be subjected to the electric current discharge at the gap, means including a conduit for conducting the granular material from said supply means into the electrode, said conduit extending into the electrode a substantial distance beyond the point at which the electrode last contacts said forming and feeding means, and resilient means carried by said conduit and in contact with the formed electrode adapted to prevent passage of granular material from the electrode to said forming and feeding means.

3. In apparatus for producing metal, in combination, means for forming a metal strip into a hollow electrode and for feeding the formed electrode to a gap whereat the electrode is fused by the discharge of electric current, supply means for granular material to be subjected to the electric current discharge at the gap, means including a conduit for conducting the granular material from said supply means into the electrode, said conduit extending into the electrode a substantial distance beyond the point at which the electrode last contacts said forming and feeding means, and a disc member of deformable resilient material attached to said conduit and in contact with the electrode which upon movement of the electrode relative to said conduit assumes a generally conical shape and prevents passage of substantial quantities of the granular raw materials from the electrode to said forming and feeding means.

4. In apparatus for producing metal, in combination, means for forming a metal strip into a hollow electrode and for feeding the formed electrode to a gap whereat the electrode is fused by the discharge of electric current, supply means for granular material to be subjected to the electric current discharge at said gap, means including a conduit for conducting the granular material from said supply means into the electrode, said conduit extending into the electrode a substantial distance beyond the point at which the electrode last contacts said forming and feeding means, and a sleeve member united to said conduit of a size to allow unimpeded movement of the electrode while providing a space between itself and the electrode so restricted that substantial quantities of raw material cannot pass to the forming and feeding means.

5. In apparatus for producing metal, in combination, means for forming a metal strip into a hollow electrode and for feeding the formed electrode to a gap whereat it is fused by the discharge of electric current, means in line with said forming and feeding means for conducting electric current to the discharge end of said electrode, said means for conducting electric current including actuating means, tubular means for supplying granular material into the formed electrode extending into the formed electrode, means restricting the space between said tubular means and the electrode to prevent passage of the granular material from the electrode to said forming and feeding means, a conduit through which said electrode passes from a point below said forming and feeding means to a point below said actuating means to prevent passage of granular material to said actuating means, and means sealing the space between the upper end of said conduit and the electrode to prevent passage of the granular material from said space to said forming and feeding means.

6. In apparatus for producing metal, in combination, means for forming a metal strip into a hollow electrode and for feeding the formed electrode to a gap whereat the electrode is fused by the discharge of electric current, supply means for granular material to be subjected to the electric current discharge at the gap, means for conducting the granular material from said supply means into the electrode, said conducting means including a conduit adapted to discharge the granular material into the formed electrode at a point therein a substantial distance beyond the last point of contact of the electrode with said forming and feeding means, the electrode including an open longitudinal seam of a width to prevent the bulk of the granular material from passing therethrough but wide enough to allow passage of dust-like particles, means for conducting electric current to a region of the electrode adjacent the discharge end thereof, said conducting means including a movable element, means for actuating said movable element positioned proximate the electrode and said forming and feeding means, and means surrounding said electrode in the region of said actuating means for preventing movement of the granular material from the electrode to said actuating means.

7. In apparatus for producing metal, in combination, means for forming a metal strip into a hollow electrode and for feeding the formed electrode to a gap whereat the electrode is fused by the discharge of electric current, supply means for granular material to be subjected to the electric current discharge at the gap, means for conducting the granular material from said supply means into the electrode, said conducting means including a conduit adapted to discharge the granular material into the formed electrode at a point therein a substantial distance beyond the last point of contact between the electrode and said forming and feeding means, the electrode including a longitudinal seam of a width to prevent the bulk of the granular material from passing therethrough but wide enough to allow passage of dust-like particles, means for conducting electric current to the region of the electrode adjacent the discharge end thereof, said conducting means including a movable element having an end extending to a point along the electrode proximate the discharge end of said conduit, means for actuating said movable element positioned at said extending end, and a tubular member surrounding said electrode, said tubular member extending from a point between said forming and feeding means and the end of said conduit to a point between the end of said conduit and the end of the electrode whereby said tubular member prevents granular material from reaching said actuating means.

8. In apparatus for producing metal, in combination, means for forming a metal strip into a hollow electrode and for feeding the formed electrode to a gap whereat the electrode is fused by the discharge of electric current, a casing member enclosing said forming and feeding means, a second casing member united to said first casing member, a tube in communication with said first casing member passing through and extending beyond said second casing member, the electrode being adapted to pass through said tube on its way to the gap, said tube serving to close communication between the electrode and the space within said second casing member, supply means for granular material to be subjected to the electric current discharge at the gap, means for conducting the granular material from said supply means into the electrode, said conducting means including a conduit adapted to discharge the granular material into the formed electrode at a point proximate the lower end of said second casing member, means carried by said conduit adjacent the discharge end thereof restricting the space between said conduit and the electrode effective to prevent passage of substantial quantities of granular material from the electrode into said first casing member, means for conducting electric current to the region of the electrode adjacent the discharge end thereof, said conducting means including a movable element having an end extending within said second casing member and means within said second casing member for actuating said movable element.

9. In apparatus for producing metal, in combination, means for feeding a hollow metal electrode to a gap, support means through which the electrode is adapted to pass, means for conducting electric current to said support means, a pair of current conducting bars parallel to said electrode and spaced therefrom, said bars being disposed adjacent opposite portions of said electrode, said bars having their upper ends extending upwards through said support means and their lower ends terminating proximate the discharge end of said electrode, contact members carried by each of said bars at the lower ends thereof adapted to contact said electrode, one of said bars being fixed against movement in said support means the other of said bars being capable of longitudinal movement, links having their ends pivoted to said bars, and means carried by said support means and connected to the upper end of said movable bar for moving said bar longitudinally to vary the spacing between said contact members, said means carried by said support means including resilient means permitting change of spacing of said contact members by irregularities in the diameter of said electrode without change in the contact pressure.

10. In apparatus for producing metal, in combination, means for feeding a hollow tubular metal electrode to a gap, support means through which the electrode is adapted to pass, the length of the electrode between said support means and said gap being such that the said electrode is not sufficiently rigid to withstand disturbances at the gap tending to cause lateral movement of the electrode, means for conducting electric current to said support means, a pair of current conducting bars parallel to said electrode and spaced therefrom, said bars being disposed adjacent diametrically opposite portions of said electrode, said bars having their upper ends extending upwards through said support means and their lower ends terminating proximate the discharge end of said electrode, contact members carried by each of said bars at the lower ends thereof adapted to contact said electrode to conduct the electric current thereto, one of said bars being fixed against movement in said support means the other of said bars being capable of longitudinal movement, links having their ends pivoted to said bars, a pair of stiffening members attached to said support means and to said fixed bar, said stiffening members being disposed on opposite sides of said fixed bar and being of a width to span the space between said bars, links having their ends pivoted to said bars, and means carried by said support means and connected to the upper end of said movable bar for moving said bar longitudinally to vary the spacing between said contact members, said means carried by said support means including resilient means permitting change of spacing of said contact members by irregularities in the diameter of said electrode without change in contact pressure.

11. In apparatus for producing metal, in combination, means for feeding a hollow tubular metal electrode having a narrow open longitudinal seam to a gap, a casing having a tube extending therethrough, said tube providing a path for said electrode through said casing and sealing said casing to the entrance of material passing the open seam of said electrode, a sleeve united to the bottom of said casing having a slot-like hole through which said tube is adapted to pass, a pair of bars flanking said tube in said slot-like hole, said bars having their upper ends in said casing and their lower ends proximate the discharge end of said electrode, contact members carried by each of said bars at the ends thereof, the upper contact members being adapted to contact said tube, the lower contact member being adapted to contact said electrode to conduct the electric current thereto, a plurality of links pivoted to each of said bars connecting the lower ends of said bars, means electrically connecting the upper end of said bars, one of said bars being fixed against movement in said sleeve, means in said casing and connected to the upper end of the bar that is free to move for moving said bar longitudinally to vary the spacing between the lower contact members, said means for moving said bar including resilient means permitting change of spacing of the contact members at the lower ends of said bars by irregularities in the diameter of the electrode without change in contact pressure, and a pair of stiffening members attached to said sleeve and to said fixed bar, said stiffening members being positioned on opposite sides of said bar and being of a width to span the space between said bars, the edges of said stiffening members adjacent said movable bar being of less thickness than the edges adjacent said fixed bar whereby longitudinal spaces are provided between said movable bar and said stiffening members through which material passing out of the open seam of the electrode may freely pass.

12. In apparatus for producing metal, in combination, means for feeding a hollow tubular electrode to a gap, support means through which the electrode is adapted to pass, the length of the electrode between said support means and said gap being such that the electrode is not sufficiently rigid to withstand disturbances at the gap tending to cause lateral movement of the electrode, means carried by said support means for conducting current from said support means to a region of the electrode proximate its discharge end, said means for conducting current including a plurality of bar members, and means attached to said bar members enlarging the lower end of said current conducting means to a size approaching that of the mold space to be employed whereby in operation lateral movement of the discharge end of the electrode beyond a predetermined amount is prevented.

ROBERT K. HOPKINS.